F. Arnold.
Egg Holder.
No. 13,414.   Patented Aug. 14, 1855.
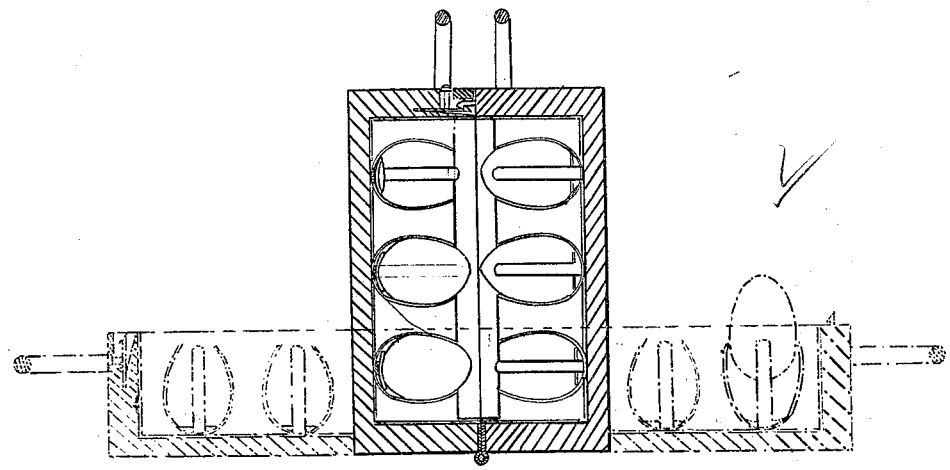
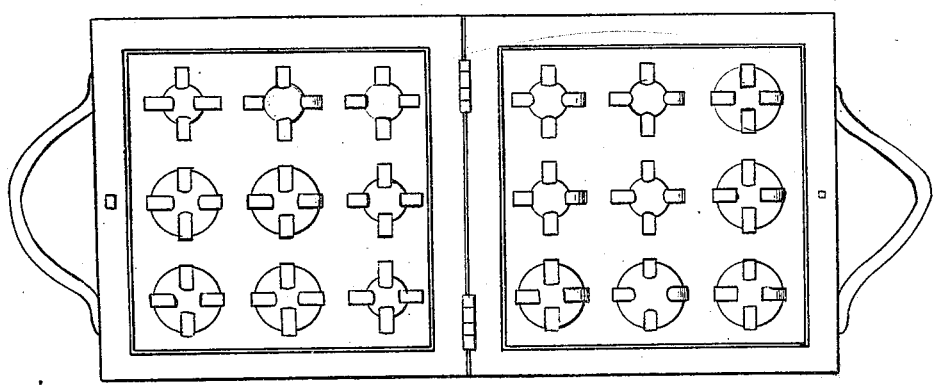

UNITED STATES PATENT OFFICE.

FRANCIS ARNOLD, OF HADDAM, CONNECTICUT.

IMPROVED EGG-HOLDER.

Specification forming part of Letters Patent No. 13,414, dated August 14, 1855.

*To all whom it may concern:*

Be it known that I, FRANCIS ARNOLD, of Haddam, in the county of Middlesex and State of Connecticut, have invented a new and useful device for holding or securing eggs in boxes for transportation, and also for holding or securing eggs on casters or other articles; and I do hereby declare that the following is a full, clear, and exact description of the same, reference being had to the annexed drawings, making a part of this specification, in which—

Figure 1 is a vertical section of a rectangular box showing my improvement, the box being closed. Fig. 2 is a plan or top view of the same, the box being open.

Similar letters of reference indicate corresponding parts in the two figures.

The nature of my invention consists in securing or holding eggs within boxes, or holding them on casters or other articles, by means of elastic clamps arranged substantially as will be presently shown and described.

To enable others skilled in the art to fully understand and construct my invention, I will proceed to describe it.

A represents a box, which is formed of two parts, *a b*, connected by hinges *c*.

To the inner surface of each of the side pieces of the parts *a b* there are secured at suitable distances apart elastic clamps B. These clamps may be formed of two flat metallic strips, C D, bent in elliptical form, (see Fig. 1,) and having the lower curved portions of the strips placed one over the other, and secured together at the point of intersection in any proper manner, the two strips crossing each other at right angles and forming four elastic prongs or plates the upper ends of which are detached from each other. The clamps where the strips cross each other are attached to the inner sides of the parts *a b* of the box A at equal distances apart, and the eggs (represented by E) are placed lengthwise between the prongs of the clamps. Said prongs by their elasticity press against the sides of the eggs and hold them securely.

The clamps may be applied to casters to hold cooked eggs for table use, and the clamps may also be attached to any suitable light framing, so that in cooking eggs they may be conveniently placed in and taken out of a vessel of boiling water.

By the above improvement eggs may be safely transported in boxes without the trouble and expense of packing them with straw, which is now done, and which does not prevent them from breaking when the boxes and casks are roughly handled. The cost of the clamps is trifling, and they may be placed in as common or cheap boxes as those now used for the purpose.

I do not confine myself to the precise construction of the clamps as herein shown, for they may be modified or varied to a certain extent in their construction. For instance, rigid prongs or strips may be used and connected to the sides of the box or other article by joints, and each prong may be provided with a spring to give it the desired elasticity. I prefer, however, the mode of construction herein described, it being simpler and also more economical to manufacture.

Having thus described my invention, what I claim as new, and desire to secure by Letters Patent, is—

Securing or holding eggs within boxes or on table-casters and other articles by means of the elastic clamps B, constructed as herein shown and described, or in an equivalent manner, for the purposes specified.

FRANCIS ARNOLD.

Witnesses:
T. W. ARNOLD,
JAMES S. SELDEN.